J. MISKEY.
PNEUMATIC TIRE WHEEL.
APPLICATION FILED OCT. 4, 1913.
1,098,677.
Patented June 2, 1914.
2 SHEETS—SHEET 2.
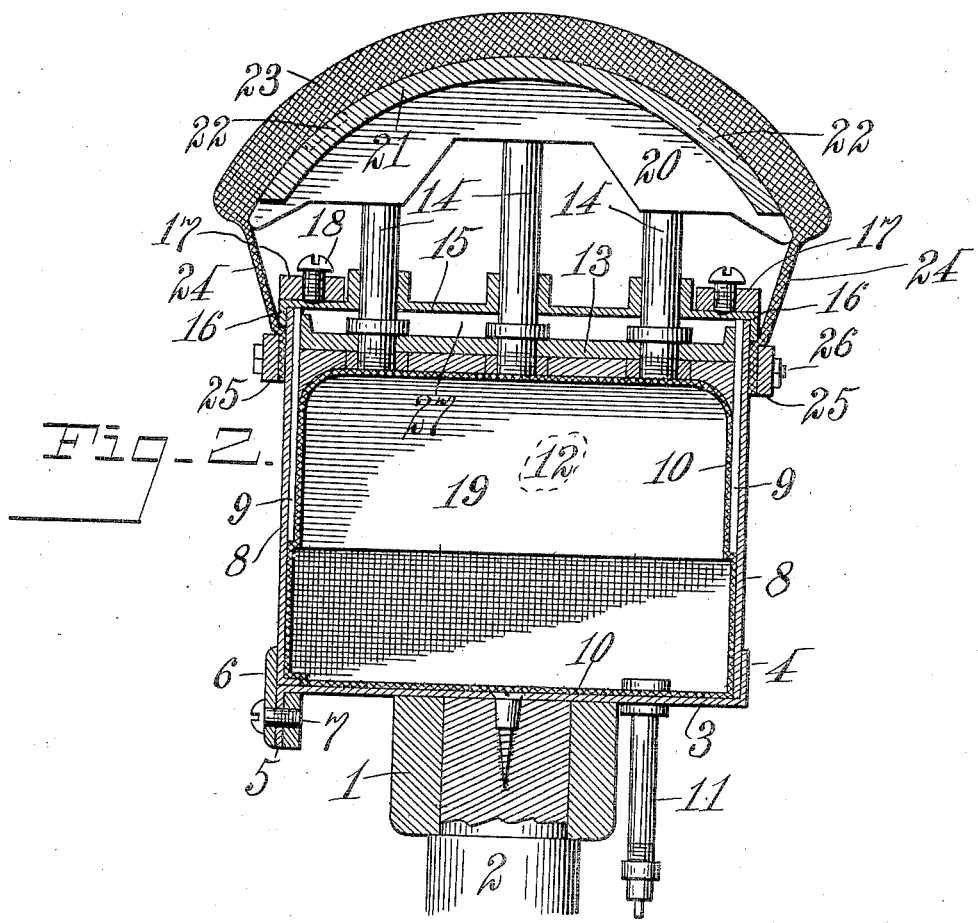
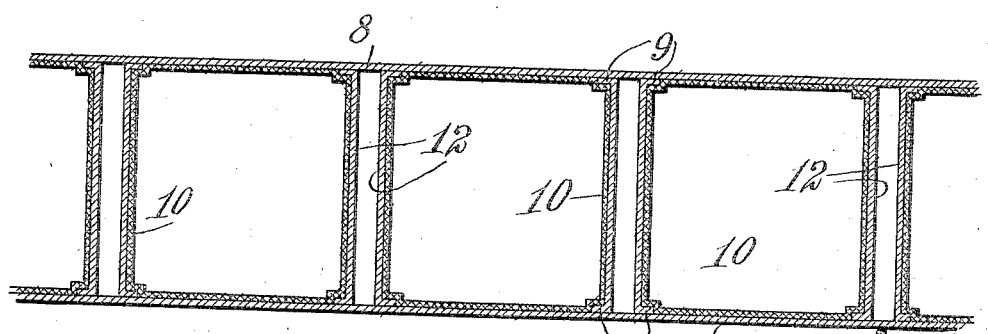
Witnesses
M. Siebler
M. Galloway
Inventor
Julius Miskey
By R. J. McCarty
his Attorney

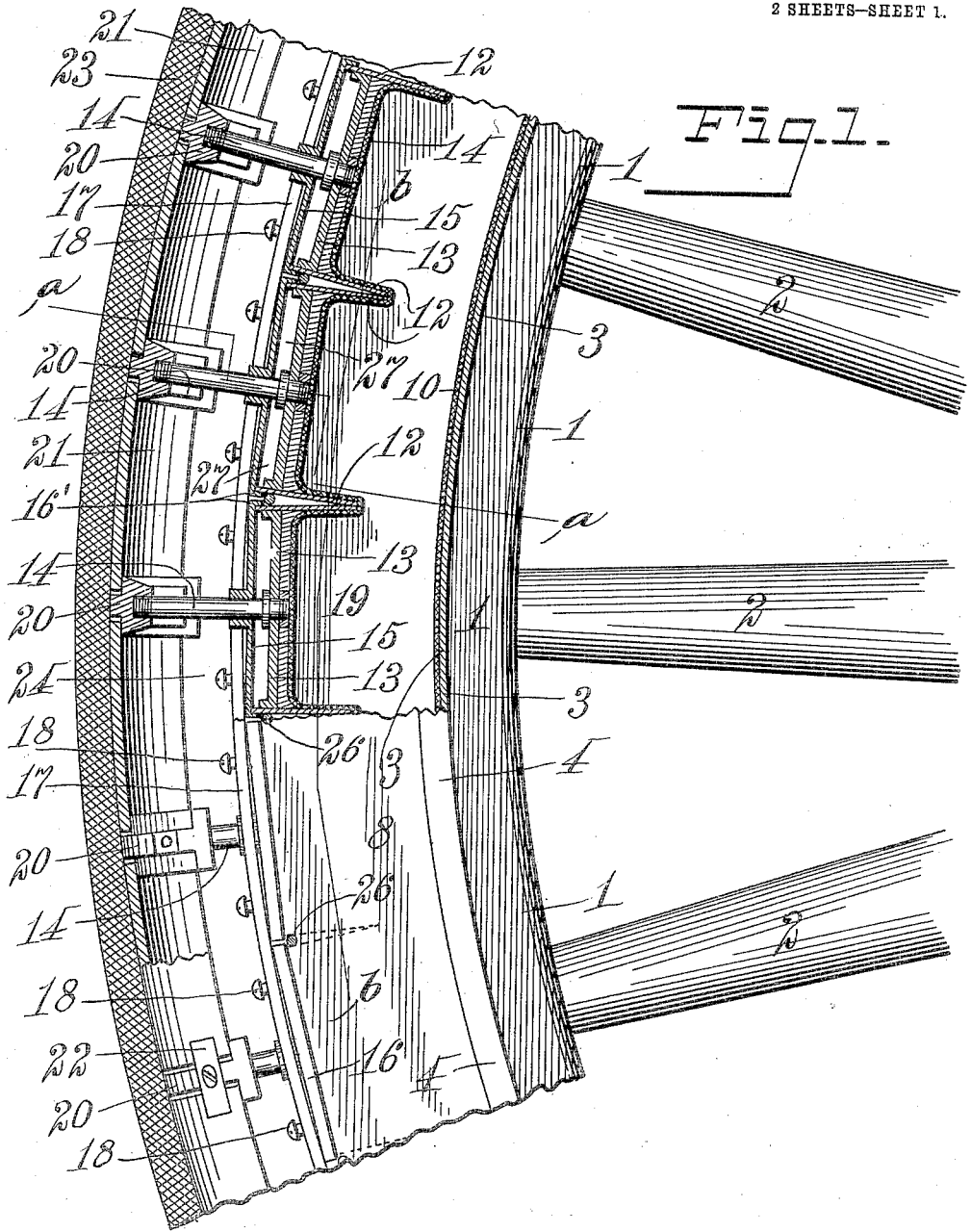

UNITED STATES PATENT OFFICE.

JULIUS MISKEY, OF DAYTON, OHIO.

PNEUMATIC-TIRE WHEEL.

1,098,677.   Specification of Letters Patent.   Patented June 2, 1914.

Application filed October 4, 1913. Serial No. 793,287.

*To all whom it may concern:*

Be it known that I, JULIUS MISKEY, a subject of the King of Hungary, residing at Dayton, in the county of Montgomery and State of Ohio, have invented certain new and useful Improvements in Pneumatic-Tire Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to new and useful improvements in pneumatic-tire wheels.

The object of the invention is to provide a wheel of the above character in which the inflatable tire is so arranged and protected as to avoid the possibility of punctures taking place therein.

Preceding a detail description of the invention, reference is made to the accompanying drawings of which—

Figure 1 is a sectional elevation of a portion of the wheel tread and adjacent ends of spokes; Fig. 2 is a cross-sectional view on the line $a$—$a$ of Fig. 1; Fig. 3 is a sectional view on the line $b$—$b$ of Fig. 1.

In a detail description of the invention, similar reference characters indicate corresponding parts throughout said description and the annexed drawings.

1 designates the felloe and 2 the spokes united thereto which are common features of wheel structure and are not required to be changed in any material sense in applying my improvement thereto.

3 designates a metallic rim having upturned and downturned marginal flanges 4 and 5. This rim is suitably secured to the felloe 1. Against the downturned marginal flanges 5 an annular plate 6 is secured by a suitable number of bolts 7. This annular plate 6 and the opposite marginal flange 4 provide a channel rim around the wheel felloe. Mounted on each side against the flange 4 and plate 6 is a metallic wall 8 which provides an annular inclosed space for the reception of an inflatable casing 10. This inflatable casing may be made of any suitable material having the proper air-confining quality as well as tenacity and pliability. In the drawing I have shown it to consist of a single thickness of material. This may be leather and on the interior thereof a rubber tube may be placed; the leather or outer casing 10 serving, in this case, as a protecting cover. The construction of the inflatable member does not involve my improvement, therefore, it will be understood that any suitable inflatable air casting may be used. As shown in Fig. 2, it lies between the walls 8—8 and air is supplied thereto by an ordinary type of valve 11 which is suitably mounted on the wheel.

12 designates a series of transverse plates mounted in the upper portion of the space between the side walls or plates 8—8. These plates 12 constitute the walls of a series of plungers or air pistons 13 which move between said plates against the air confined within the inflatable casing 10. The plates or walls 12 project into the space in which said inflatable tire lies a substantial distance to form walls for said pistons. The ends of said plates 12 are provided with flanges 9 which snugly join the side walls 8. Being so projected, said plates 12 engage the upper surface of the inflatable member 10 and form a series of air pockets 19 in the outer circumference of said member. The pistons 13 engage the outer surface of said inflatable member above said pockets and meet with a cushion-like resistance as the wheel turns. Each piston consists of two plates secured to three plunger rods 14 which pass downward through openings in transverse guide plates 15. The guide plates 15 have downturned marginal flanges 16 which lap over the outer ends of the side walls 8 and thus maintain said walls 8 in a proper position. The guide plates 15 also have lateral marginal flanges 16' which overlap the outer edges of the piston walls 12 and thus maintain said walls in a proper position to co-act with the pistons 13. The guide plates 15 are held in position by marginal bands 17 which are made secure by a suitable number of screws 18. The space 27 between each guide plate 15 and piston 13 may be supplied with a suitable lubricant in assembling the parts.

Secured to the outer ends of each set of plunger rods 14 is a cross-head 20, the outer surface of which provides seats for a series of bridge plates 21 which are secured to said cross-heads by a suitable number of clips 22. These bridge plates 21 constitute the outermost rim of the wheel. Inclosing the bridge plates 21 is a solid rubber tread or tire 23 the margins of which are extended downwardly in the form of shields 24 which are secured to the metallic side walls 8 by annular bands 25 which in turn are secured by a suitable number of screws or bolts 26. By this construction and arrangement of the tread, a dust-proof character is imparted to the wheel.

It will be seen from the accompanying drawings that the inflatable tire is set in a considerable distance from the tread of the wheel and that the possibility of puncture is wholly eliminated. It will also be apparent that the well known elasticity inherent in the pneumatic tire will be imparted to the outer circumference of the wheel through the series of plungers or pistons 13 each of which acts independently of its neighbor and all of which, collectively, provide the desired resiliency.

While I have with some minuteness described details, I do not wish to be understood as limiting myself to any unessential detail for the reason that details in many structures may be varied more or less without affecting results or the essential operation of an invention. This is true of the present invention. There may be more or less modification or change made in some of the details. The parts may be lighter than they appear to be in the drawings and it will be understood that suitable material is employed throughout.

Without departing from the spirit of my invention which is to, in a practical way, locate the inflatable tire in such a position as to protect it from the possibility of puncture, I claim as my invention;

1. In a wheel of the type specified, the combination with a felloe, of annular walls united to said felloe and providing an annular chamber therearound, a series of members projected into the outer annular portion of said chamber and providing a series of outer circumferential pockets therein, an inflatable tube within said chamber and pockets, a series of pressure members engaging said inflatable tube within said pockets, and a series of bridge plates connected with said pressure members and forming the tread of the wheel, substantially as specified.

2. In a wheel of the type specified, the combination with a felloe, of annular members united thereto and forming a chamber therearound, a series of division members lying within the outer portion of said chamber throughout the extent thereof and providing a series of pockets in said outer portion, an inflatable tube occupying said chamber and pockets, a series of pressure members engaging the outer surface of said inflatable tube within said pockets, metallic tread members united to said pressure members, and an elastic tread united to said metallic tread members, substantially as specified.

3. In a wheel of the type specified, the combination with a felloe, of members united thereto and providing an annular chamber therearound, a series of plates extending into the outer portion of said chamber throughout the extent thereof and forming a series of pockets, an inflatable tube within said chamber and pockets, a corresponding series of plungers movable between said plates against the casing within said pockets, a series of rods fixedly connected to said plungers, a series of cross members to which the outer ends of said rods are fixedly connected, and a series of bridge plates spanning the spaces between said cross members and supported thereon, substantially as specified.

4. In a wheel of the type specified, the combination with the inner rim of a wheel, and a series of channel members united thereto and forming an annular channel therearound, of a series of plates projected into the outer circumference of said channel and providing a series of pockets therein, a series of plungers movable between said pocket plates and forming outer closures of said pockets, a compressible tube within said channel and pockets and engaged by said plungers, a series of cross heads fixedly connected to said plungers, an outer inclosing case having marginal extensions united to the channel members, and a series of tread members interposed between the cross heads and supporting said outer inclosing case, substantially as specified.

In testimony whereof I affix my signature in presence of two witnesses.

JULIUS MISKEY.

Witnesses:
VICTOR PARTOS,
R. J. McCARTY.